United States Patent
Wood et al.

(10) Patent No.: US 7,160,063 B2
(45) Date of Patent: Jan. 9, 2007

(54) COOLANT FEED DRILL NOZZLE WITH THRUST-VECTORED EXHAUST

(75) Inventors: Jeffrey H. Wood, Eureka, MO (US); Kevin J. Sitton, Winfield, MO (US)

(73) Assignee: The Boeing Company, Chicago, IL (US)

( * ) Notice: Subject to any disclaimer, the term of this patent is extended or adjusted under 35 U.S.C. 154(b) by 458 days.

(21) Appl. No.: 10/693,274

(22) Filed: Oct. 24, 2003

(65) Prior Publication Data

US 2005/0105975 A1    May 19, 2005

(51) Int. Cl.
*B23B 47/34* (2006.01)
*B23Q 11/10* (2006.01)

(52) U.S. Cl. .................. 408/61; 408/67; 409/136; 409/137

(58) Field of Classification Search ............... 408/67, 408/56, 60–61, 95, 97; 409/136–137, 135; *B23Q 11/10; B23B 47/34*
See application file for complete search history.

(56) References Cited

U.S. PATENT DOCUMENTS

| | | | |
|---|---|---|---|
| 3,537,341 A * | 11/1970 | Zahuranec et al. ........... 82/128 |
| 3,837,383 A * | 9/1974 | Ko ............................ 144/251.2 |
| 4,340,326 A * | 7/1982 | Buonauro et al. ............. 408/16 |
| 5,033,917 A | 7/1991 | McGlasson et al. |
| 5,213,454 A * | 5/1993 | Givler et al. ................. 408/61 |
| 5,395,187 A | 3/1995 | Slesinski et al. |
| 5,474,116 A * | 12/1995 | Shoda ...................... 144/252.1 |
| 5,482,411 A | 1/1996 | McGlasson |
| 5,487,629 A * | 1/1996 | Watanabe ................... 409/137 |
| 5,584,618 A | 12/1996 | Blankenship et al. |
| 5,779,402 A * | 7/1998 | Kameda ....................... 408/56 |
| 5,988,954 A | 11/1999 | Gaskin et al. |
| 6,059,494 A * | 5/2000 | Susnjara ..................... 409/134 |
| 6,200,075 B1 | 3/2001 | Gaskin et al. |
| 2002/0136612 A1 * | 9/2002 | Martinez et al. ............ 408/174 |
| 2005/0084344 A1 * | 4/2005 | Dods et al. ................... 408/67 |

* cited by examiner

*Primary Examiner*—Monica Carter
*Assistant Examiner*—J Williams
(74) *Attorney, Agent, or Firm*—Ingrassia Fisher & Lorenz, P.C.

(57) ABSTRACT

A drill nozzle includes a housing having a bristle brush ring attached. The housing of the drill nozzle may include an air intake, multiple coolant inlets, multiple coolant jets, a vacuum tube, and mounting flanges. The air intake may provide a thrust-vectored down draft into the vacuum tube. The coolant inlets may receive coolant fluid that may be expelled from the coolant jets towards a drill bit. Drilling debris and coolant fluid may be contained inside the bristle brush ring preventing damage and soiling of surrounding structures and areas and may be extracted with the vacuum tube. The drill nozzle may be attached to a drill motor unit of a numerically controlled drill jig, enabling the use of such numerically controlled drill jig for drilling high quality holes effectively into non-flat surfaces, for example, the leading edge extension spar of the F-18 aircraft.

27 Claims, 12 Drawing Sheets

COOLANT FEED DRILL NOZZLE WITH THRUST-VECTORED EXHAUST

BACKGROUND OF THE INVENTION

The present invention generally relates to devices that can be attached to a drill motor and methods for providing coolant to a drill bit and for chip extraction during a drilling process and, more particularly, to a coolant feed drill nozzle with a thrust-vectored intake and a method for providing coolant to a drill bit and for vacuum extraction of drilling debris during drilling on non-flat surfaces.

Advanced aircraft, for example, the F-18, require many holes to be drilled into the fuselage of the aircraft. A numerically controlled drill jig exists for use on the forward fuselage of an F-18 aircraft. The numerically controlled drill jig offers an ergonomic, portable, foundation-free system for drilling holes into the skin of the aircraft that easily adapts to changes in the fabrication process while improving hole quality. This system utilizes a drill head unit that provides pressure to the fuselage skin of an aircraft, injects coolant towards a drill bit, and exhausts chips and dust occurring during the drilling process. Although the numerically controlled drill jig enables simple and low cost automation of the manufacturing process, the drill head unit of this system can only be used on the skins of the aircraft. Since the drill head unit of the numerically controlled drill jig is designed to apply pressure to the fuselage skins during the drilling process, a flat contact surface is necessary for the use of this drill head unit. Currently, if the numerically controlled drill jig is used for drilling holes into non-flat surfaces, for example, the leading edge extension spar of the F-18 aircraft that comprises recessed pockets and stiffened walls, the existing drill head unit must be removed. Since coolant injection and vacuum extraction of drilling debris is still needed, the machine operator must apply the coolant injection and vacuum extraction manually. However, manually applying the coolant to the drill bit and manually vacuum extracting the drilling debris is a dangerous, inconvenient, and time-consuming process.

There has, therefore, arisen a need to provide a drill head unit for use with the existing numerically controlled drill jig that enables the effective use of the numerically controlled drill jig on non-flat surfaces, for example, the leading edge extension spar of the F-18 aircraft. There has further arisen a need to provide a drill head unit that allows coolant injection towards the drill bit and vacuum extraction of the drilling debris such that the operation is safe, convenient, and timesaving. There has also arisen a need to provide a drill head unit, such as a drill nozzle, that may be easily attached to the existing numerically controlled drill jig and therefore, allows a low cost automation of the-drilling process on non-flat surfaces during the manufacturing, process of an aircraft. There has further arisen a need to provide a method for providing coolant to a drill bit during the drilling process on non-flat surfaces, for example the leading edge extension spar of the F-18 aircraft, while vacuum extracting the drilling debris, for example, chips, dust, and coolant, such that no drilling debris may damage the surrounding surfaces or may injure a machine operator.

Prior art further describes several drill motor vacuum attachments, for example U.S. Pat. No. 5,988,954 and U.S. Patent application No. U.S. Pat. No. 6,200,075 B1, both issued to Gaskin et al., and U.S. Pat. No. 5,033,917 issued to McGlasson et al. Even though these patents describe devices for vacuum extraction of drilling debris, for example, chip swarf and dust particles, these devices either don't allow coolant injection towards the drill bit (U.S. Pat. No. 5,988,954 and U.S. Patent application No. U.S. Pat. No. 6,200,075 B1) or these devices are too complex and not suitable to address the needs described above.

Prior art further discloses several devices for clamping a drill motor to a drill plate, for example, U.S. Pat. No. 5,395,187 issued to Slesinski et al., U.S. Pat. No. 5,482,411 issued to McGlasson, and U.S. Pat. No. 5,584,618 issued to Blankenship et al. These prior art devises comprise an apparatus for securely clamping a drill motor to a drill plate in order to drill precisely positioned holes in a work piece. These prior art devices comprise attachments to a drill motor but do not provide coolant injection towards a drill bit or vacuum extraction of the drilling debris during the drilling process. Further, these prior art devices are not suitable for the use on non-flat surfaces, for example, the leading edge extension spar of the F-18 aircraft, to address the needs described above.

As can be seen, there is a need for a drill nozzle that allows coolant injection towards a drill bit such that the drill bit may be engulfed during the drilling operation. Also, there is a need for a drill nozzle that allows vacuum extraction of drilling debris during the drilling operation, such that no chips, dust, or remaining coolant fluid may damage or soil the surrounding surfaces or may injure a machine operator. Further, there is a need for a drill nozzle that may be attached to the drill motor unit of a prior art numerically controlled drill jig to enable the use of the numerically controlled drill jig for non-flat surface of an advanced aircraft, for example, the leading edge extension spar of the F-18 aircraft. Moreover, there is a need for a method for providing coolant to a drill bit during the drilling process on non-flat surfaces, for example, the leading edge extension spar of the F-18 aircraft, while vacuum extracting the drilling debris, for example, chips, dust, and coolant, and, therefore, improving the drill hole quality.

SUMMARY OF THE INVENTION

The present invention provides a drill nozzle that can be attached to a drill motor unit and that allows coolant injection towards a drill bit during the drilling operation while vacuum extracting the drilling debris at the same time, such that no chips, dust, or remaining coolant fluid may exit the drill nozzle towards the drill motor unit. The present invention further provides a drill nozzle that is suitable for, but not limited to, being attached to a drill motor unit of a prior art numerically controlled drill jig, enabling the use of such numerically controlled drill jig for drilling high quality holes effectively into non-flat surfaces, for example, the leading edge extension spar of the F-18 aircraft. The present invention still further provides a method for providing coolant to a drill bit during the drilling process on non-flat surfaces while vacuum extracting the drilling debris, such that no drilling debris may damage or spoil the drill motor unit, to which the drill nozzle of the present invention may be attached, or any surrounding structures and surfaces.

In one aspect of the present invention, a drill nozzle comprises a housing having a bristle brush ring attached. The housing includes a first section and a second section. The first section has a cylindrical elongated shape, a hollow interior, a first axis, and extends along the first axis. The first section has a first open end and a second open end opposite from the first open end, the first open end and the second open end being terminal ends spaced apart along the first axis and defining a spherical internal chamber therein. The first section includes an air intake having a cylindrical shape, the air intake being located proximate to the second open end and above the second section, the air intake extending the housing downward in a right angle to the first axis. The first section further includes a first coolant inlet having a cylindrical shape and extending the housing sideward in a right angle to the first axis, a first integrally molded coolant passageway, and a first set of at least two coolant jets, the first coolant passageway connecting the first coolant inlet with the first set of coolant jets, wherein the first set of coolant jets is integrally molded into the first open end. The first section further includes a second coolant inlet having a cylindrical shape and extending the housing sideward in a direction opposite to the first coolant inlet and in a right angle to the first axis, a second integrally molded coolant passageway, and a second set of at least two coolant jets, the second coolant passageway connecting the second coolant inlet with the second set of coolant jets, wherein the second set of coolant jets is integrally molded into the first open end. The second section has a cylindrical elongated shape, a hollow interior, and a second axis being in a right angle with the first axis, the second section extending downward from the first section along the second axis and the second section being located proximate to the second open end of the first section. The second section includes a vacuum tube being in connection with the spherical internal chamber of the first section. The second section further includes at least two mounting flanges having an aperture, the mounting flanges being located proximate to the intersection of the first section and the second section and the mounting flanges extending sideward from the housing to opposite sides in a right angle to the first axis and the second axis. The bristle brush ring is attached to the first section of the housing proximate to the first open end.

In another aspect of the present invention, a drill nozzle comprises a housing having a bristle brush ring attached and a mounting device attaching the housing to a drill motor unit. The housing includes a first section and a second section. The first section has a cylindrical elongated shape, a hollow interior, a first axis, and extends along the first axis. The first section has a first open end and a second open end opposite from the first open end, the first open end and the second open end being terminal ends spaced apart along the first axis and defining a spherical internal chamber therein. The first section includes an air intake having a cylindrical shape, the air intake being located proximate to the second open end and above the second section, the air intake extending the housing downward in a right angle to the first axis. The first section further includes a first coolant inlet having a cylindrical shape and extending the housing sideward in a right angle to the first axis, a first integrally molded coolant passageway, and a first set of at least two coolant jets, the first coolant passageway connecting the first coolant inlet with the first set of coolant jets, wherein the first set of coolant jets is integrally molded into the first open end. The first section further includes a second coolant inlet having a cylindrical shape and extending the housing sideward in a direction opposite to the first coolant inlet and in a right angle to the first axis, a second integrally molded coolant passageway, and a second set of at least two coolant jets, the second coolant passageway connecting the second coolant inlet with the second set of coolant jets, wherein the second set of coolant jets is integrally molded into the first open end. The second section has a cylindrical elongated shape, a hollow interior, and a second axis being in a right angle with the first axis, the second section extending downward from the first section along the second axis and the second section being located proximate to the second open end of the first section. The second section includes a vacuum tube being in connection with the spherical internal chamber of the first section. The second section further includes at least two mounting flanges having an aperture, the mounting flanges being located proximate to the intersection of the first section and the second section and the mounting flanges extending sideward from the housing to opposite sides in a right angle to the first axis and the second axis. The bristle brush ring is attached to the first section of the housing proximate to the first open end.

In still another aspect of the present invention, a numerically controlled drill jig comprises a drill motor unit, a drill nozzle attached to the drill motor unit, a bristle brush ring, and a mounting device. The housing includes a first section and a second section. The first section has a cylindrical elongated shape, a hollow interior, a first axis, and extends along the first axis. The first section has a first open end and a second open end opposite from the first open end, the first open end and the second open end being terminal ends spaced apart along the first axis and defining a spherical internal chamber therein. The first section includes an air intake having a cylindrical shape, the air intake being located proximate to the second open end and above the second section, the air intake extending the housing downward in a right angle to the first axis. The first section further includes a first coolant inlet having a cylindrical shape and extending the housing sideward in a right angle to the first axis, a first integrally molded coolant passageway, and a first set of at least two coolant jets, the first coolant passageway connecting the first coolant inlet with the first set of coolant jets, wherein the first set of coolant jets is integrally molded into the first open end. The first section further includes a second coolant inlet having a cylindrical shape and extending the housing sideward in a direction opposite to the first coolant inlet and in a right angle to the first axis, a second integrally molded coolant passageway, and a second set of at least two coolant jets, the second coolant passageway connecting the second coolant inlet with the second set of coolant jets, wherein the second set of coolant jets is integrally molded into the first open end. The second section has a cylindrical elongated shape, a hollow interior, and a second axis being in a right angle with the first axis, the second section extending downward from the first section along the second axis and the second section being located proximate to the second open end of the first section. The second section includes a vacuum tube being in connection with the spherical internal chamber of the first section. The second section further includes at least two mounting flanges having an aperture, the mounting flanges being located proximate to the intersection of the first section and the second section and the mounting flanges extending sideward from the housing to opposite sides in a right angle to the first axis and the second axis. The bristle brush ring is attached to the first section of the housing proximate to the first open end. The bristle brush ring is attached to the first section of the housing proximate to the first open end. The mounting device attaches the housing to the drill motor unit. The mounting device includes two horse shoe brackets that attach to a base section of the drill motor unit, a mounting plate in rigid connection with the horse shoe brackets, and two adjustable slides attached to the mounting plate at opposite sides, wherein the adjustable slides connect the mounting plate with the mounting flanges of the housing.

In a further aspect of the present invention, a coolant feed drill nozzle with thrust-vectored intake comprises a housing, a bristle brush ring, a band clamp, an external pressurized air source, an external coolant source, and an external vacuum source. The housing includes a first section and a second section. The first section has a cylindrical elongated shape, a hollow interior, a first axis, and extends along the first axis. The first section has a first open end and a second open end opposite from the first open end, the first open end and the second open end being terminal ends spaced apart along the first axis and defining a spherical internal chamber therein. The first section includes an air intake having a cylindrical shape, the air intake being located proximate to the second open end and above the second section, the air intake extending the housing downward in a right angle to the first axis. The first open end of the first section of the housing has a first outer diameter and a first inner diameter being smaller than the first outer diameter, wherein the second open end of the first section of the housing has a second outer diameter and a second inner diameter being smaller than the second outer diameter, and wherein the first inner diameter is larger than the second inner diameter. The first section includes an air intake having a cylindrical shape and a barbed fitting, the air intake being located proximate to the second open end and above the second section, the air intake extending the housing downward in a right angle to the first axis. The air intake includes an integrally molded manifold air nozzle, the air nozzle providing a thrust-vectored down draft into the second section of the housing. The first section further includes a first coolant inlet having a cylindrical shape, a barbed fitting, and an integrally molded coolant nozzle, the first coolant inlet extending the housing sideward in a right angle to the first axis, a first integrally molded coolant passageway, and a first set of at least two coolant jets, the first coolant passageway connecting the first coolant inlet with the first set of coolant jets, wherein the first set of coolant jets is integrally molded into the first open end. The first section further includes a second coolant inlet having a cylindrical shape, a barbed fitting, and an integrally molded coolant nozzle, the second coolant inlet extending the housing sideward in a direction opposite to the first coolant inlet and in a right angle to the first axis, a second integrally molded coolant passageway, and a second set of at least two coolant jets, the second coolant passageway connecting the second coolant inlet with the second set of coolant jets, wherein the second set of coolant jets is integrally molded into the first open end. The first set of coolant jet and the second set of coolant jets are evenly spaced around the circumference of the first open end and between the first outer diameter and the first inner diameter of the first end, and wherein each of the coolant jets is positioned to expel coolant fluid toward the first axis. The second section has a cylindrical elongated shape, a hollow interior, and a second axis being in a right angle with the first axis, the second section extending downward from the first section along the second axis and the second section being located proximate to the second open end of the first section. The second section includes a vacuum tube being in connection with the spherical internal chamber of the first section. The second section further includes at least two mounting flanges having an aperture, the mounting flanges being located proximate to the intersection of the first section and the second section and the mounting flanges extending sideward from the housing to opposite sides in a right angle to the first axis and the second axis. The bristle brush ring is attached to the first section of the housing proximate to the first open end. The bristle brush ring is attached to the first section of the housing proximate to the first open end. The band clamp secures the bristle brush ring to the housing. The external pressurized air source provides pressurized air to the air intake. The external coolant source provides coolant to the first coolant inlet and the second coolant inlet. The external vacuum source provides suction to the vacuum tube.

In still another aspect of the present invention, a method for providing coolant to a drill bit and for vacuum extracting drilling debris generated during a drilling process on non-flat surfaces comprises the steps of: providing a drill motor unit including a drill bit; providing a drill nozzle including: a housing having an air intake, multiple coolant inlets, multiple coolant passageways, multiple coolant jets, a vacuum tube, and mounting flanges; and a bristle brush ring attached to the housing; attaching the drill nozzle to the drill motor unit using the mounting flanges; providing pressurized air to the air intake and creating a thrust-vectored down draft into the vacuum tube; providing coolant fluid through the coolant inlets and through the coolant passageways toward the coolant jets; expelling coolant fluid onto the drill bit; providing suction to the vacuum source; drilling a hole into a non-flat surface and generating drilling debris; vacuum extracting the drilling debris trough the vacuum tube; preventing drilling debris from exiting the housing of the drill nozzle towards the drill motor unit by providing the thrust-vectored down draft; containing the drilling debris and coolant fluid inside the bristle brush ring, wherein the bristle brush ring touches the non-flat surface; and preventing damaging and soiling surrounding structures and surfaces with the bristle brush ring.

These and other features, aspects and advantages of the present invention will become better understood with reference to the following drawings, description and claims.

DETAILED DESCRIPTION OF THE INVENTION

Figure 1:
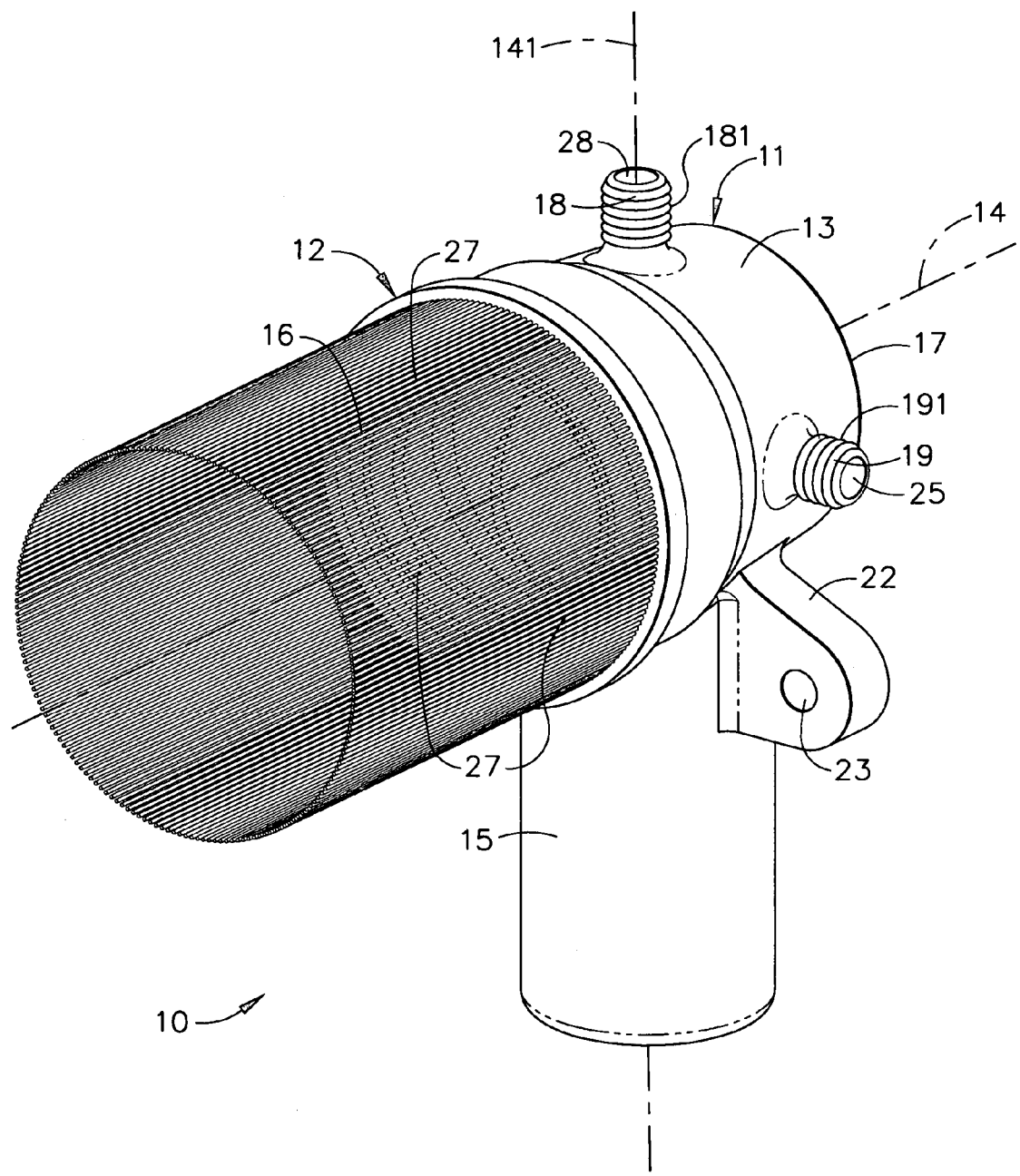
FIG. 1 is an external perspective view of a drill nozzle according to one embodiment of the present invention.
Figure 2:
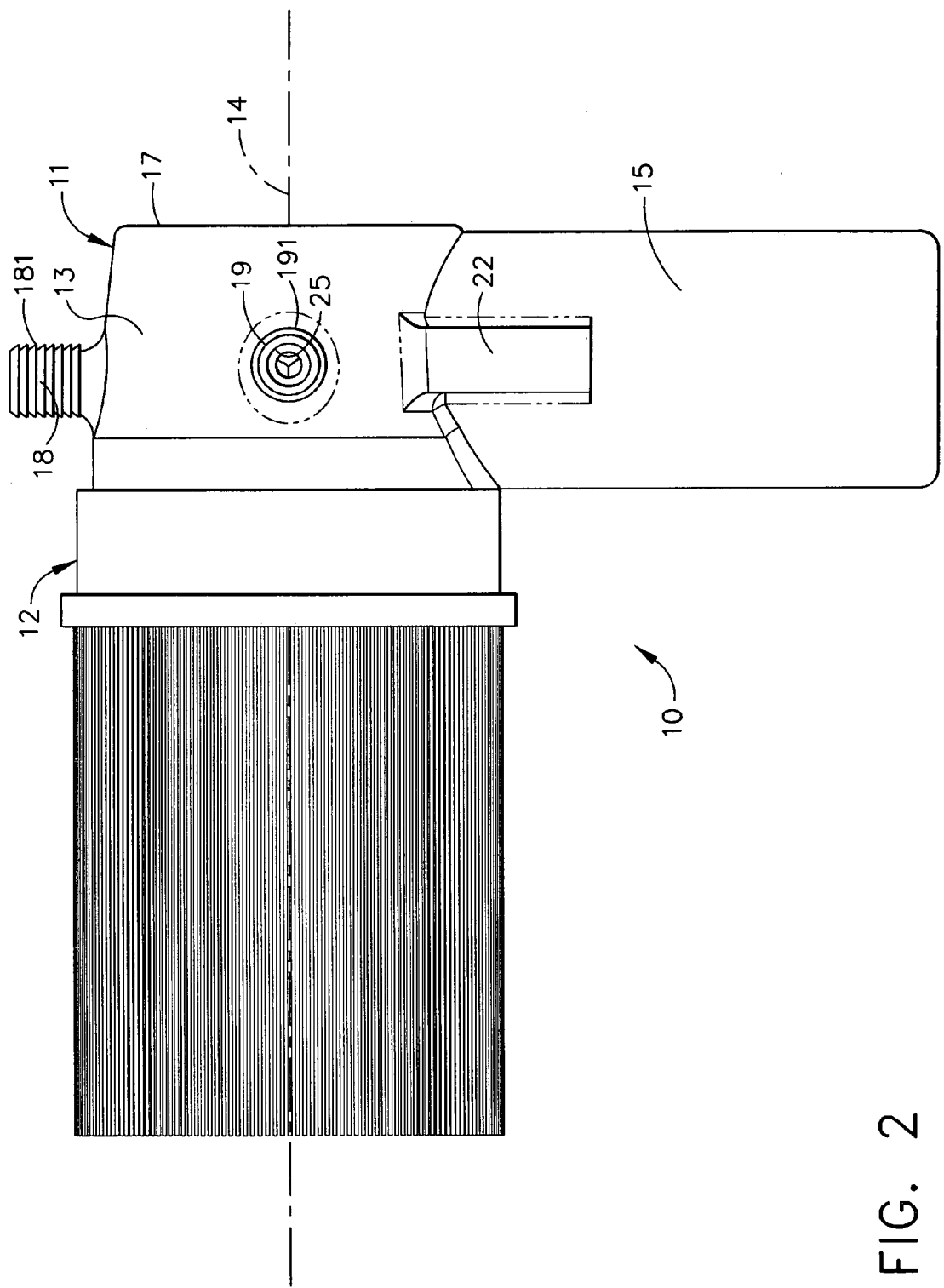
FIG. 2 is an external side view of the drill nozzle according to one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, an embodiment of the present invention provides a drill nozzle suitable for drilling into non-flat surfaces. The drill nozzle according to an embodiment of the present invention may be attached to a drill motor unit, and therefore, eliminates the dangerous manual operation of the coolant and vacuum processes of the prior art. An embodiment of the present invention also provides a drill nozzle that allows coolant injection towards a drill bit during the drilling operation on non-flat surfaces while vacuum extracting the drilling debris at the same time such that no chips, dust, or remaining coolant fluid may exit the drill nozzle towards the drill motor unit, and such that surrounding surfaces and structures may not be spoiled or damaged. In contrast to the known prior art, the drill nozzle according to one embodiment of the present invention includes a housing having an air intake, coolant inlets, and a vacuum tube. The air intake provides an air curtain that prevents the drilling debris from existing the drill nozzle towards the drill motor unit while the vacuum tube extracts the drilling debris and the coolant fluid provided by the coolant inlets away from the work area. Furthermore, the drill nozzle according to one embodiment of the present invention may have a bristle brush ring attached, which is not available in any known prior art drill motor attachment. The bristle brush ring prevents surrounding structures and surfaces from being soiled or damaged. In contrast to the prior art, these features of the drill nozzle according to one embodiment of the present invention facilitate using the drill nozzle for drilling into non-flat surfaces.

An embodiment of the present invention further provides a drill nozzle that is suitable for, but not limited to, being attached to a drill motor unit of a prior art numerically controlled drill jig, enabling the use of such numerically controlled drill jig for drilling high quality holes into non-flat surfaces, for example, the leading edge extension spar of an F-18 aircraft. In the prior art such a drill nozzle is not available. An embodiment of the present invention further provides a drill nozzle that has a simple mechanical design and may be manufactured using a fused deposition modeled process for rapid prototyping, which is relatively easily accessible and relatively inexpensive. An embodiment of the present invention still further provides a method for providing coolant to a drill bit during the drilling process on non-flat surfaces using a numerically controlled drill jig while vacuum extracting the drilling debris such that no drilling debris may damage or spoil the drill motor unit, to which the drill nozzle of the present invention may be attached, or any surrounding structures. In contrast to the prior art, the provided drill nozzle as in one embodiment of the present invention includes a housing having an air intake, multiple coolant inlets, multiple coolant passageways, multiple coolant jets, a vacuum tube, and mounting flanges, and has a bristle brush ring attached. These features of the drill nozzle as in one embodiment of the present invention allow connecting the drill nozzle to a numerically controlled drill jig, providing an air curtain to avoid damage to the attached drill motor, providing coolant fluid onto a drill bit, providing suction for debris removal, and containing the drilling debris and coolant fluid inside the bristle brush ring, preventing damaging and soiling of surrounding surfaces and structures.

A drill nozzle according to one embodiment of the present invention will make it possible to use a prior art numerically controlled drill jig for drilling high quality holes into non-flat surfaces, for example, the leading edge extension spar of the F-18 aircraft. Therefore, no dangerous and ineffective manual operation of the coolant delivery and of the vacuum extraction process is needed as there is with the prior art use of a numerically controlled drill jig for drilling holes into the leading edge extension spar of the F-18 aircraft. Since the drill nozzle of the present invention may be easily attached to a drill motor unit of the prior art numerically controlled drill jig after the existing drill head unit is removed, the drilling process on non-flat surfaces, for example, the leading edge extension spar of the F-18 aircraft, has now a reduced cycle time while providing accurately positioned high quality drill holes compared to prior art manual operation.

In one embodiment, the present invention provides a drill nozzle that comprises a thrust-vectored intake that receives pressurized air and provides a thrust-vectored draft down into a vacuum tube. Therefore, an air curtain may be provided that prevents the rear escape of metal chips and composite dust that are generated during the drilling process, eliminating the potential of personal injury inherent to prior art manual operation. None of the known prior art devices provides an air curtain that prevents the rear escape of metal chips and composite dust. Furthermore, the drill motor unit to which the drill nozzle of the present invention is attached may now be protected from being damaged by escaping metal chips or composite dust during the drilling process, which is not easily done during prior art manual operation.

In one embodiment, the present invention provides a drill nozzle that may have a bristle brush containment ring attached that surrounds the drill bit and prevents metal chips, composite dust, and coolant fluid to spoil or damage surfaces or structures adjacent to the area of the drilling process. In the prior art, such a bristle brush containment ring is not available.

In one embodiment, the present invention provides a drill nozzle that may be attached to a prior art numerically controlled drill jig using adjustable slides that make it possible to extend or retract the drill nozzle of the present invention as needed due to the size of the drill bit used for a certain application. Therefore, the use of the drill nozzle of the present invention is universal and not limited to a specific application, thus providing an advantage over prior art drill motor attachments. The drill nozzle according to one embodiment of the present invention may be used universally as an attachment to a variety of drill motor units providing coolant injection toward a drill bit and vacuum extraction of drilling debris during the drilling process on non-flat surfaces as well as flat surfaces. Consequently, the use of the drill nozzle according to one embodiment of the present invention is not limited to aircraft manufacturing but may be used for numerous industrial/commercial applications.

Figure 3:
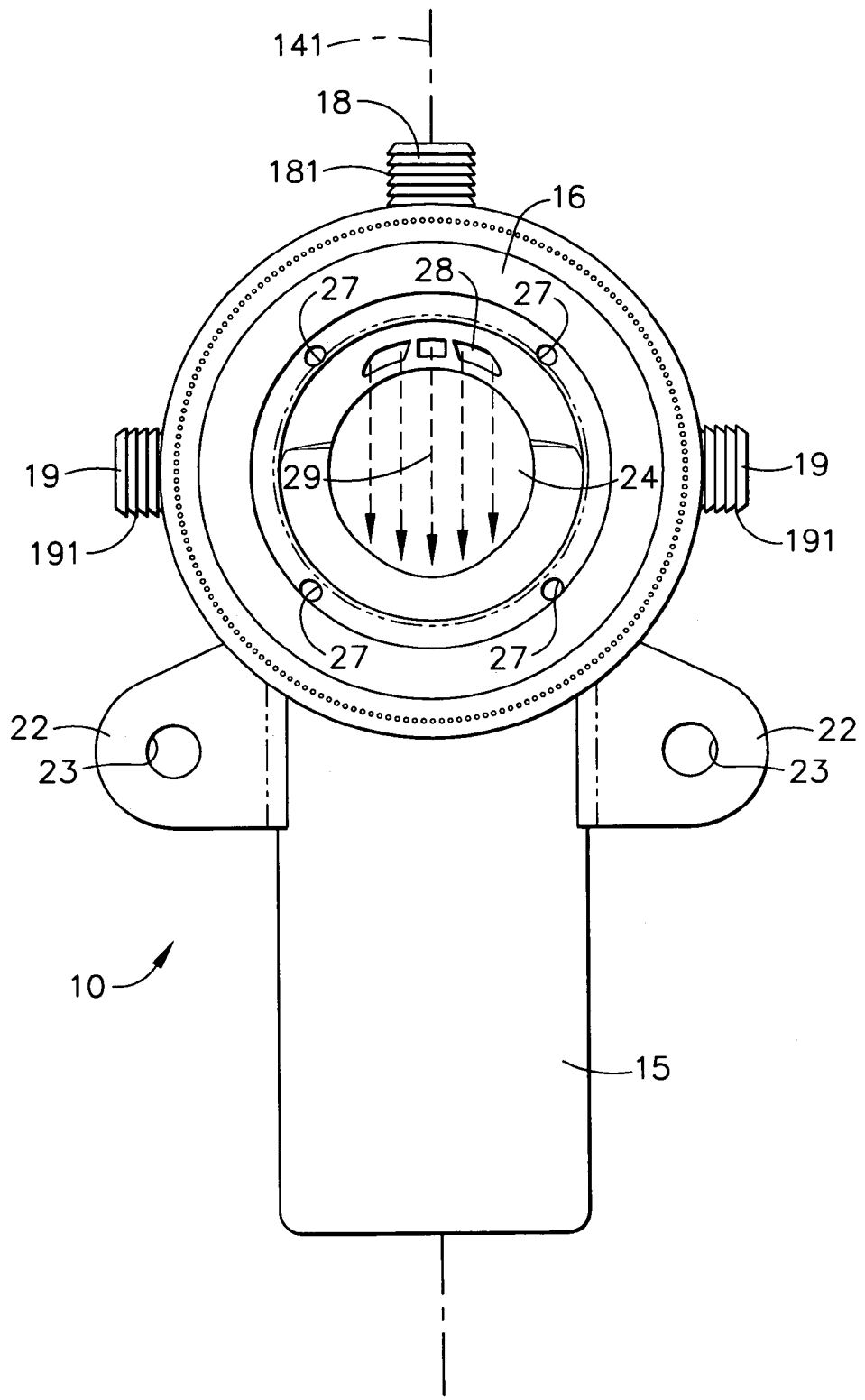
FIG. 3 is an external front view of the drill nozzle according to one embodiment of the present invention.
Figure 4:
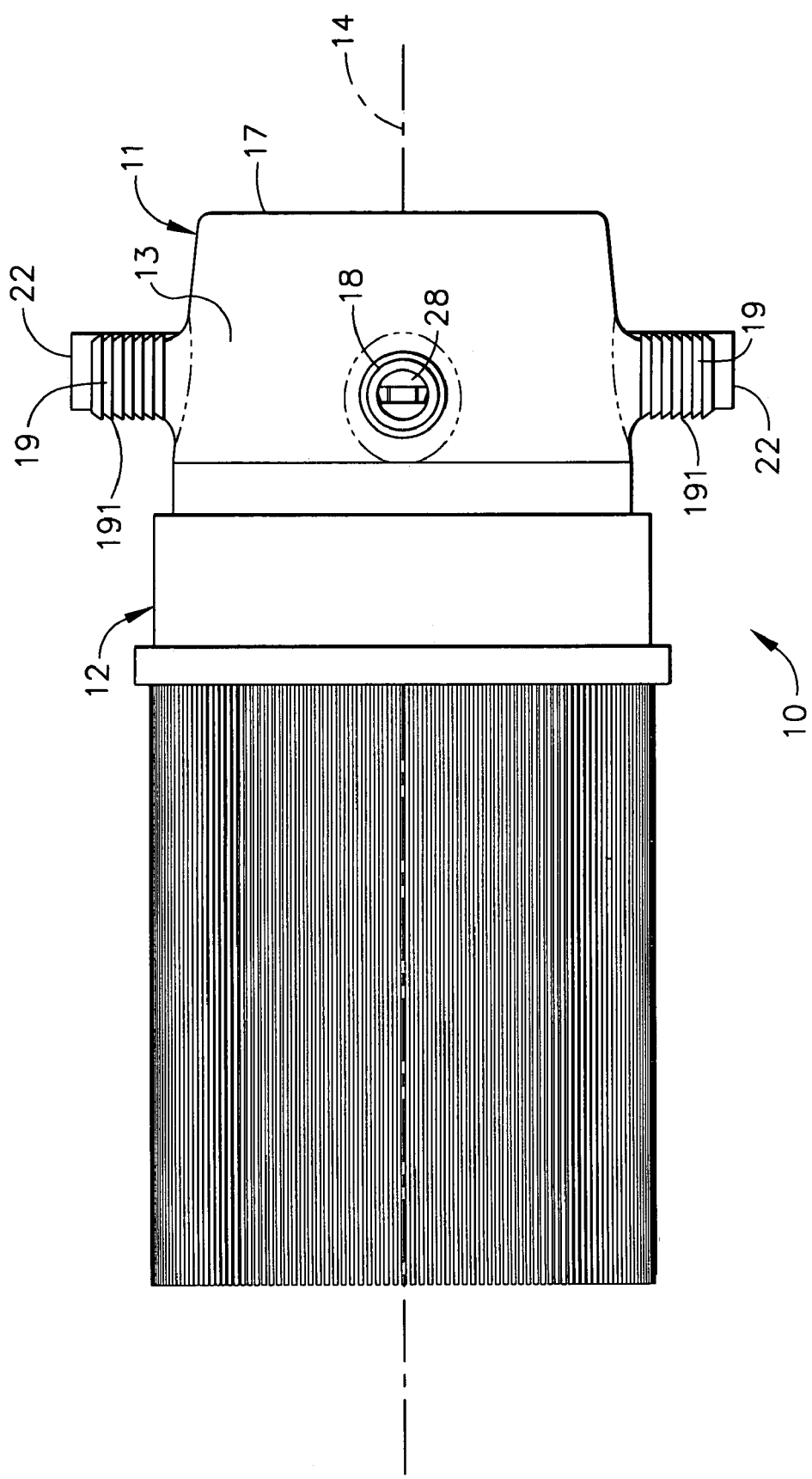
FIG. 4 is an external top view of the drill nozzle according to one embodiment of the present invention.
Figure 5:
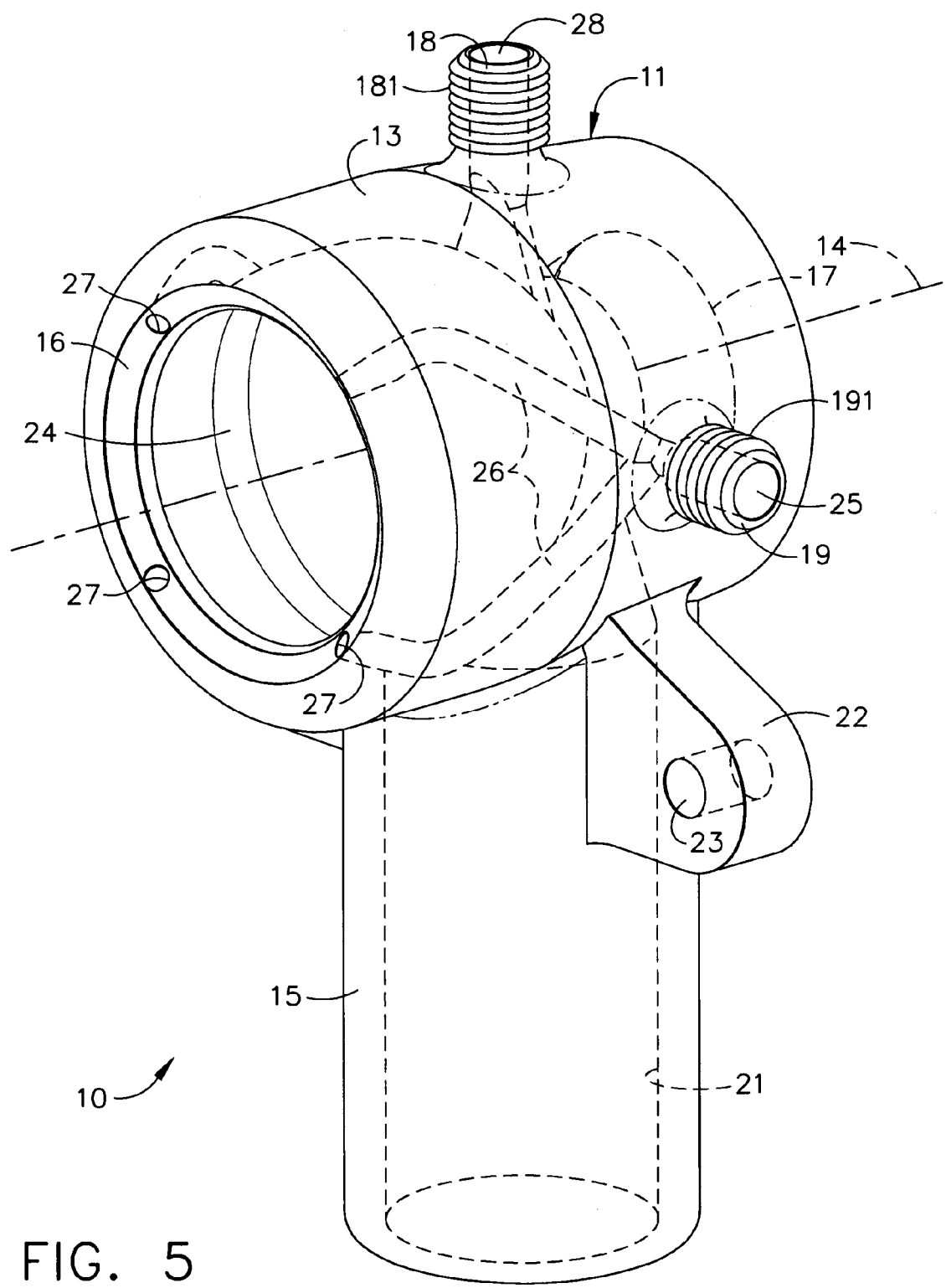
FIG. 5 is an internal perspective view of the drill nozzle according to one embodiment of the present invention.
Figure 6:
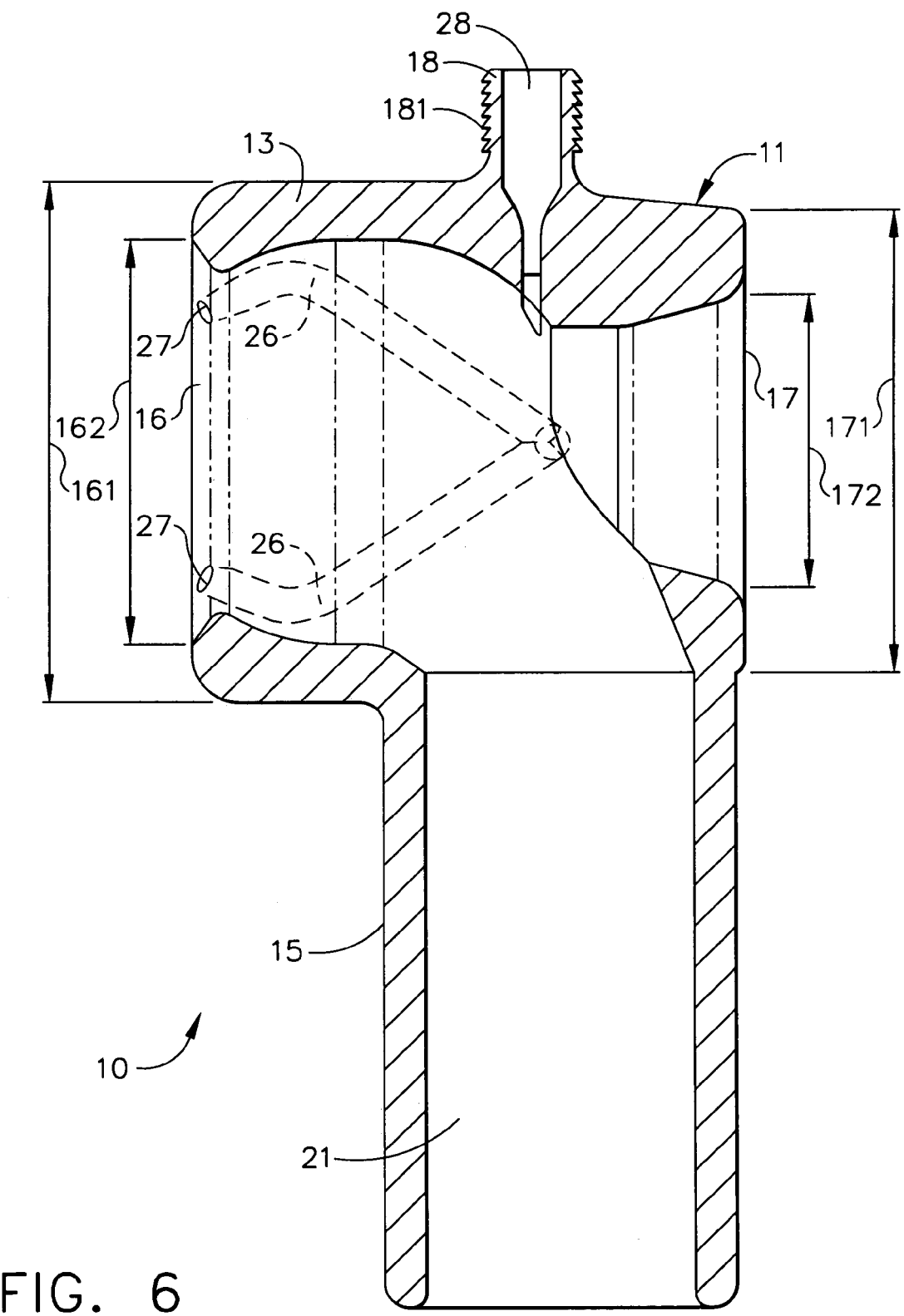
FIG. 6 is an internal side view of the drill nozzle according to one embodiment of the present invention.
Figure 7:
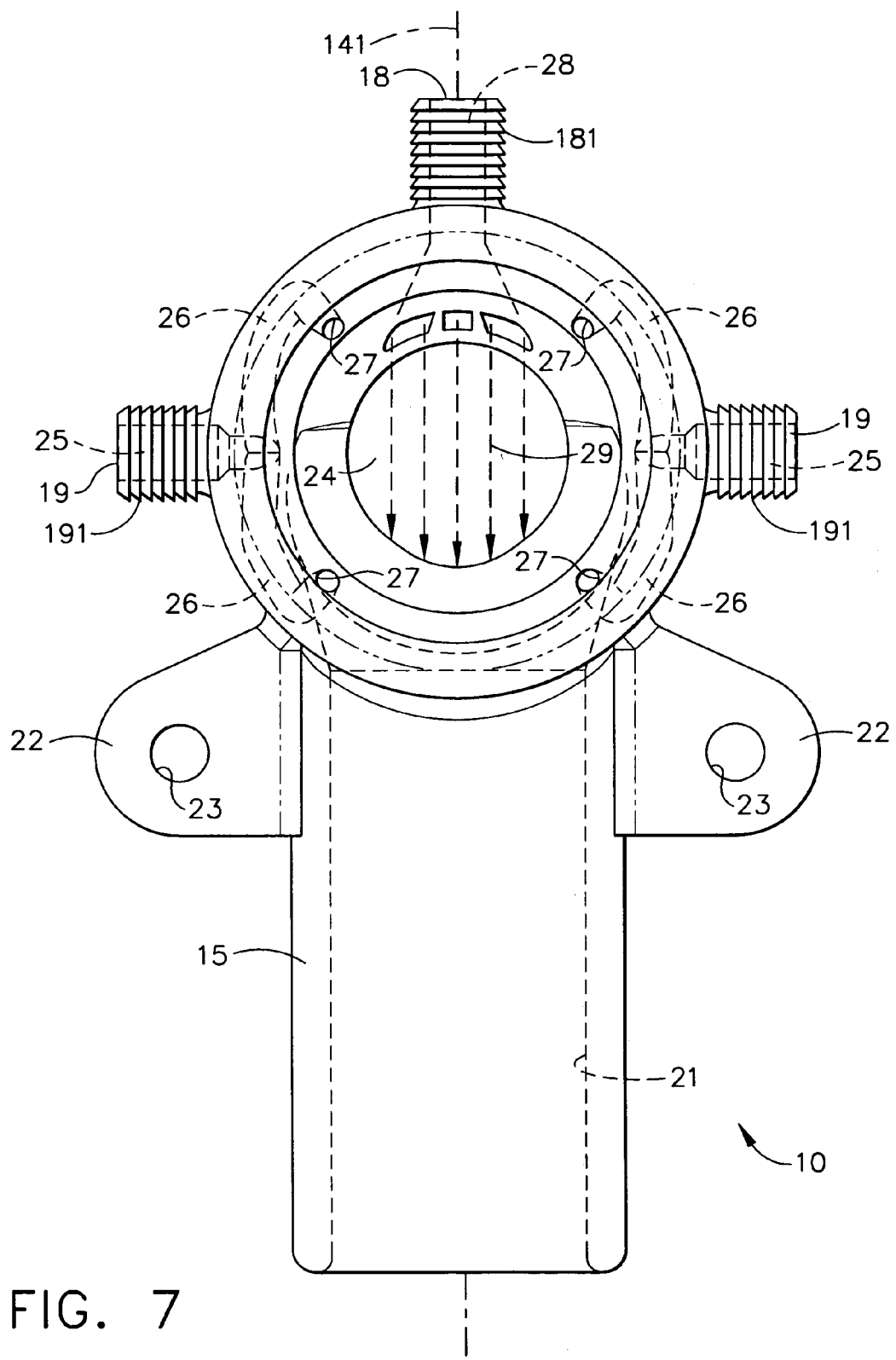
FIG. 7 is an internal front view of the drill nozzle according to one embodiment of the present invention.
Figure 8:
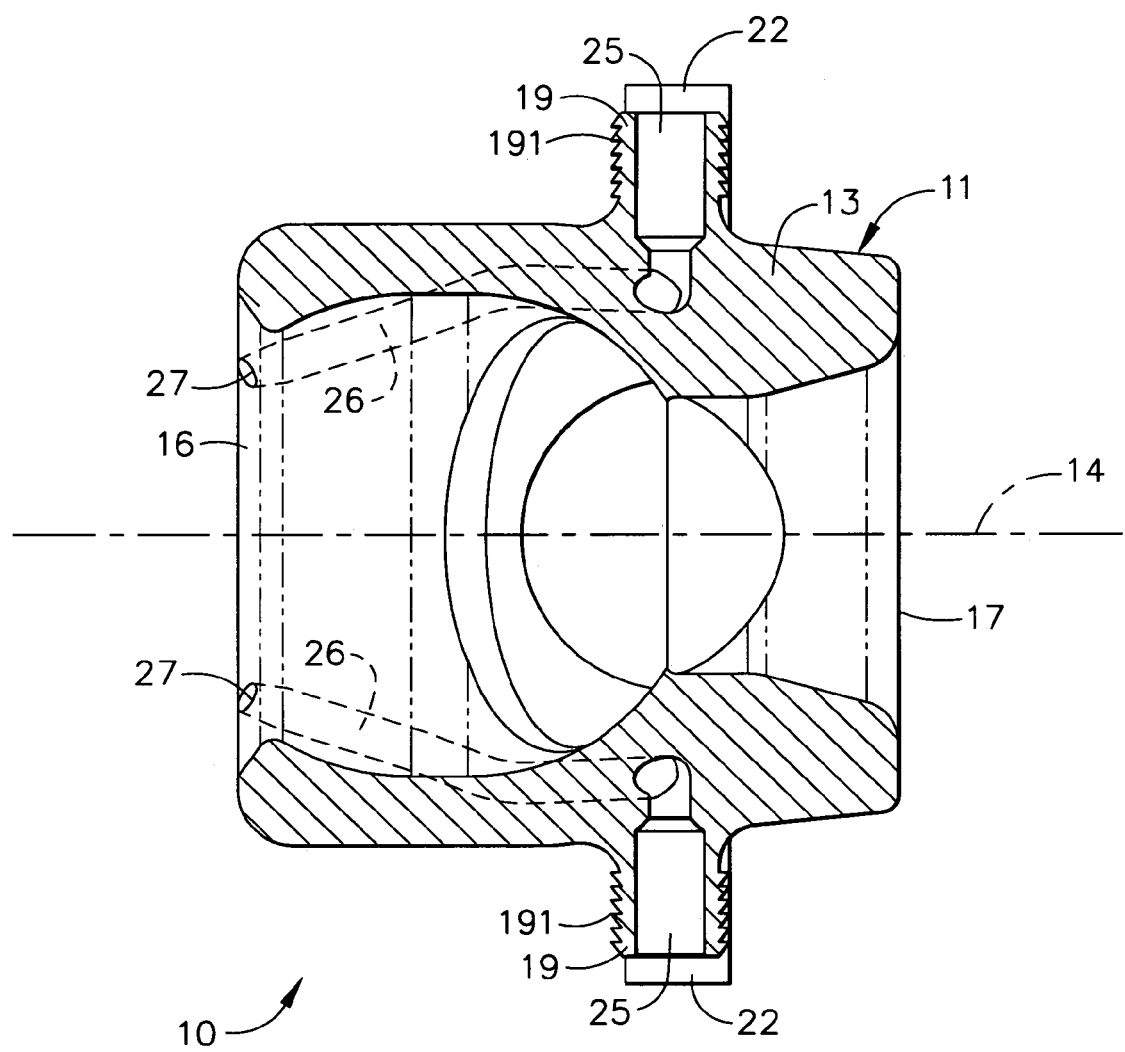
FIG. 8 is an internal top view of the drill nozzle according to one embodiment of the present invention.

Referring now to FIGS. 1, 2, 3, and 4, an external view of a drill nozzle 10 is illustrated according to one embodiment of the present invention. The drill nozzle 10 may include a housing 11 and a bristle brush ring 12. The housing 11 may include a first section 13 and a second section 15. The first section 13 may have a cylindrical elongated shape and a hollow interior and may extend along a first axis 14. The second section 15 may have a cylindrical elongated shape and a hollow interior and may extend downward from the first section 13 along a second axis 141 in a preferably 90-degree angle in reference to the first axis 14. The first section 13 intersects with the second section 15 of the housing 11, as shown in FIG. 1. The first section 13 of the housing 11 may have a first open end 16 and a second open end 17 opposite from the first open end 16. The first open end 16 and the second open end 17 may be terminal ends spaced apart along the first axis 14. The first section 13 of the housing 11 may include an air intake 18, and at least two coolant inlets 19. The second section 15 of the housing 11 may include a vacuum tube 21 (as shown in FIGS. 5, 6, and 7) and at least two mounting flanges 22. The second section 15 of the housing 11 may be located proximate to the second open end 17 of the first section 13. The first open end 16 and the second open end 17 of the first section 13 of the housing 11 define a spherical internal chamber 24 therein that may be in connection with the vacuum tube 21, as shown in FIGS. 3, 5, and 7. The air intake 18 has a preferably cylindrical shape and extends the housing 11 downward along the second axis 141, preferably in a right angle to the first axis 14. The air intake 18 may be located proximate to the second open end 17 and above the second section 15 of the housing 11. The at least two coolant inlets 19 may have a cylindrical shape and extend the housing 11 sideward, preferably in a right angle to the first axis 14. The air intake 18 may have a barbed fitting 181 for attaching a hose delivering pressurized air, as shown in FIG. 3. The hose delivering pressurized air may be secured to the air intake 18 using a band clamp or similar devices. Each of the at least two coolant inlets 19 may have a barbed fitting 191 for attaching a hose delivering coolant fluid, as shown in FIG. 3. A different hose delivering coolant may be attached to each coolant inlet 19 using a band clamp or similar device.

Figure 9:
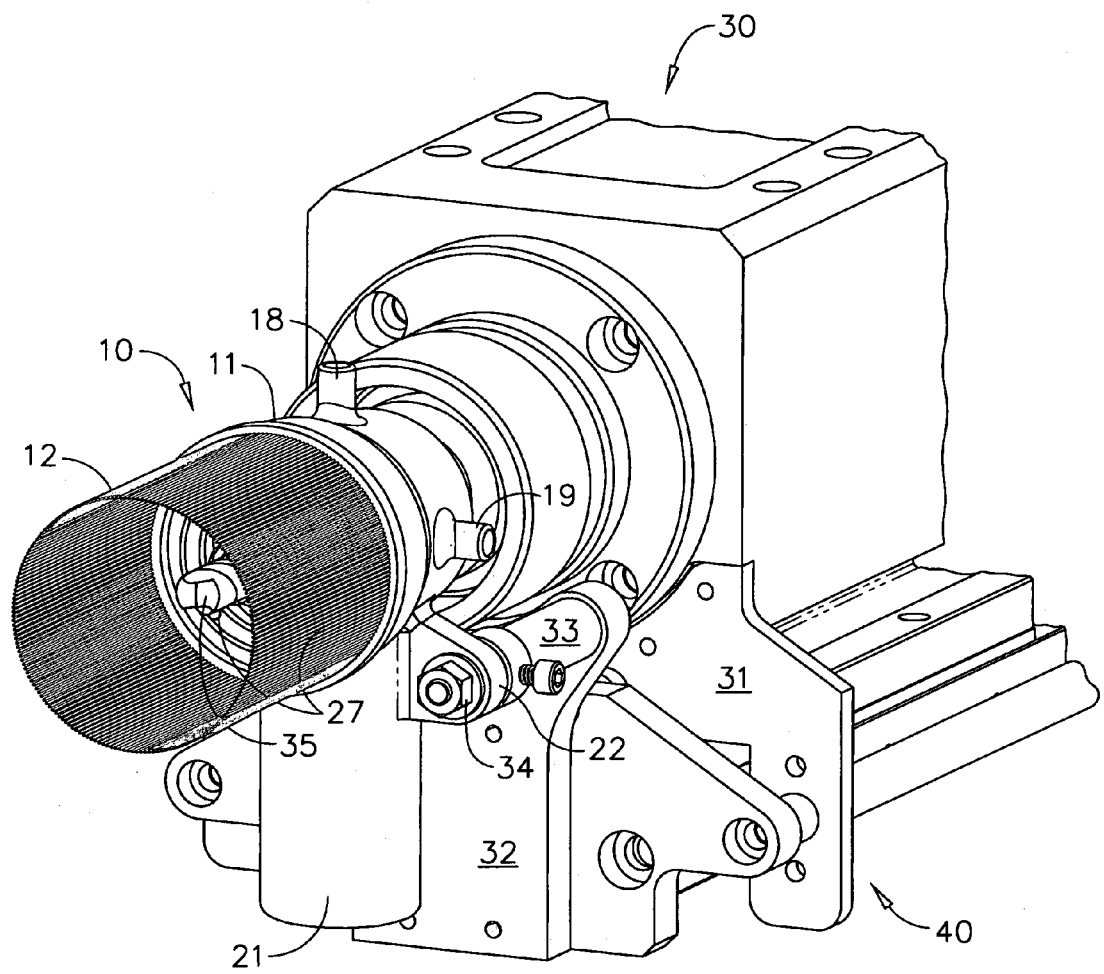
FIG. 9 is a perspective view of the drill nozzle attached to a drill motor unit according to another embodiment of the present invention.

As shown in FIG. 3, the at least two mounting flanges 22 of the second section 15 of the housing 11 may be located proximate to the intersection of the first section 13 and the second section 15 and may extend sideward from the housing 11 to opposite sides, preferably in a right angle to the first axis 14 and the second axis 141, as shown in FIGS. 1 and 3. Furthermore, each mounting flange 22 may include an aperture 23 for mounting the housing 11 to a drill motor unit 30, as shown in FIG. 9. The second section 15 of the housing 11 may have an external vacuum source (not shown) attached, which may be secured with a band clamp or similar device.

The housing 11 of the drill nozzle 10 may be made of acrylonitrile butadiene styrene (ABS) plastic and may be manufactured in one piece using a fused deposition modeled process, a rapid prototyping technology. The bristle brush ring 12 may be attached to the first section 13 of the housing 11 by wrapping the bristle brush ring 12 around the housing 11 proximate to the first open end 16 (shown in FIG. 1) and may be secured using a band clamp or similar device (not shown). The bristle brush ring 12 is available for any outer diameter 161 of the first open end 16. Furthermore, the bristle brush ring 12 used for the containment of metal chips, composite dust, and coolant fluid is commercially available.

Referring now to FIGS. 5, 6, 7, and 8, an internal view of a drill nozzle 10 is illustrated according to one embodiment of the present invention. The first open end 16 may have a first outer diameter 161 and a smaller first inner diameter 162. The second open end 17 may have a second outer diameter 171 and a smaller second inner diameter 172 (shown in FIG. 6). The first inner diameter 162 may be larger than the second inner diameter 172. The second inner diameter 172 of the second open end 17 of the housing 11 may be designed to be large enough to allow a drill bit pass through and to move freely.

As illustrated in FIGS. 5, 6, and 7, each coolant inlet 19 includes an integrally molded coolant nozzle 25 for receiving coolant from an external source (not shown). Each coolant nozzle 25 may branch off into at least two coolant passageways 26 that may include coolant jets 27 at the opposite end. The coolant passageways 26 are integrally molded into the first section 13 of the housing 11 around the chamber 24 such that the coolant jets 27 are evenly spaced around the circumference of the first open end 16 and between the first outer diameter 161 and the first inner diameter 162 of the first end 16. Further, the coolant jets 27 may be designed such that the expelled coolant fluid is directed towards the first axis 14, as shown in FIG. 6. Such designed coolant jets 27 will enable that a drill bit passing through the first section 13 of the housing 11 along the first axis 14 may be engulfed with coolant fluid during the drilling operation.

A shown in FIGS. 5, 6, 7, and 8, the air intake 18 may include a manifold air nozzle 28 that may be integrally molded into the air intake 18 during the manufacturing process of the housing 11. The air nozzle 28 may be located at the back of the internal chamber 24 proximate to the second open end and above the vacuum tube 21 along the second axis 141, as shown in FIGS. 5, 6, and 7. The air nozzle 28 may receive pressurized air from an external source (not shown) that may be attached to the air intake 18. The air nozzle 28 may provide a thrust-vectored down draft 29 into the vacuum tube 21, as shown in FIGS. 3 and 7. The thrust-vectored down draft 29 may function as an air curtain to prevent the rear escape of metal chips and composite dust that are generated during the drilling process through the second open end 17 of the housing 11.

As illustrated in FIGS. 5 and 6, the internal chamber 24 may be in communication with the vacuum tube 21, wherein the vacuum tube 21 may intersect with the internal chamber 24 proximate to the second open end 17. This design may enable the removal of drilling debris generated during the drilling process as well as remaining coolant fluid through the vacuum suction. This process may be also supported by the thrust-vectored down draft 29, as shown in FIGS. 3 and 7.

Figure 10:
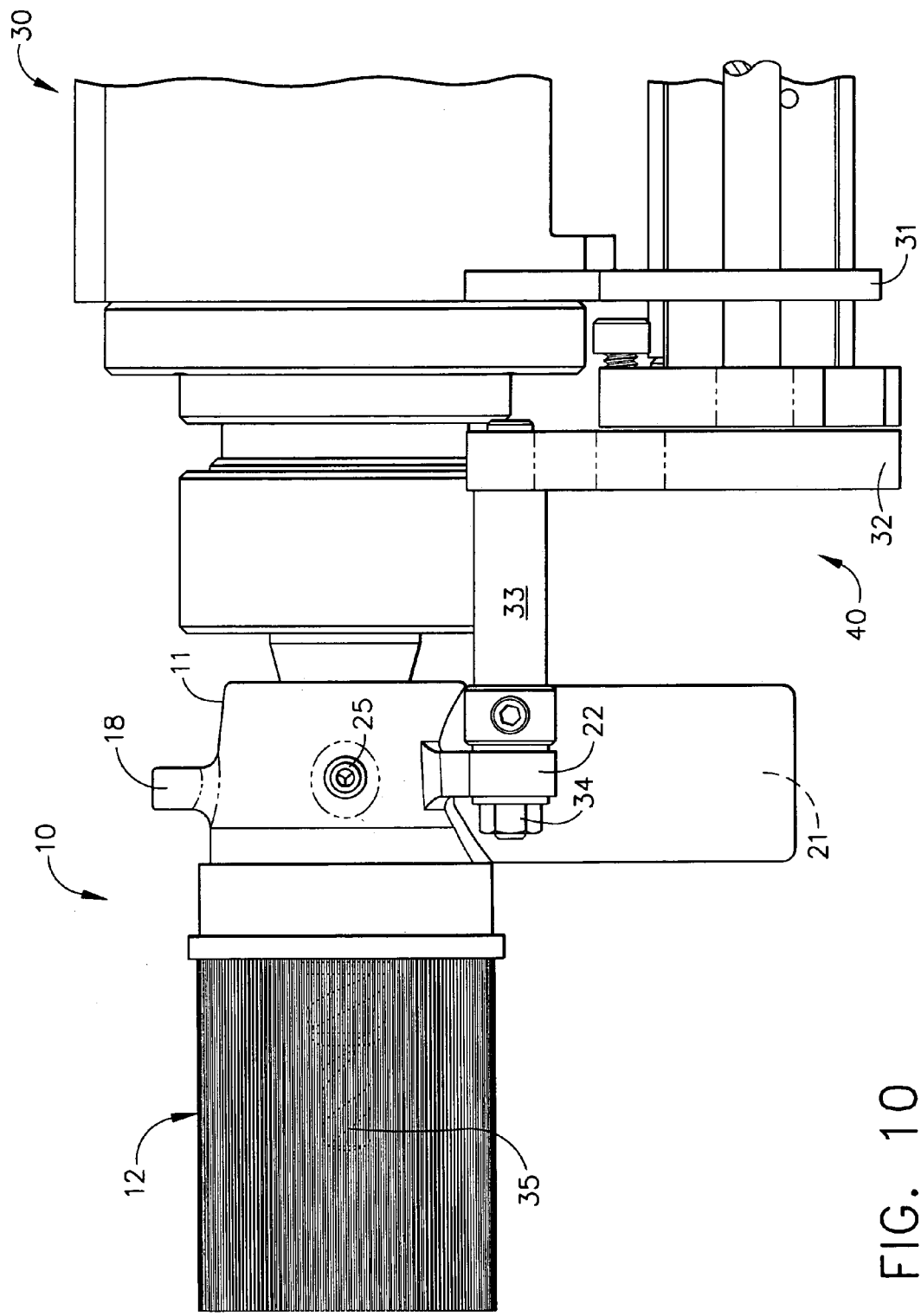
FIG. 10 is a side view of the drill nozzle attached to the drill motor unit according to another embodiment of the present invention.
Figure 11:
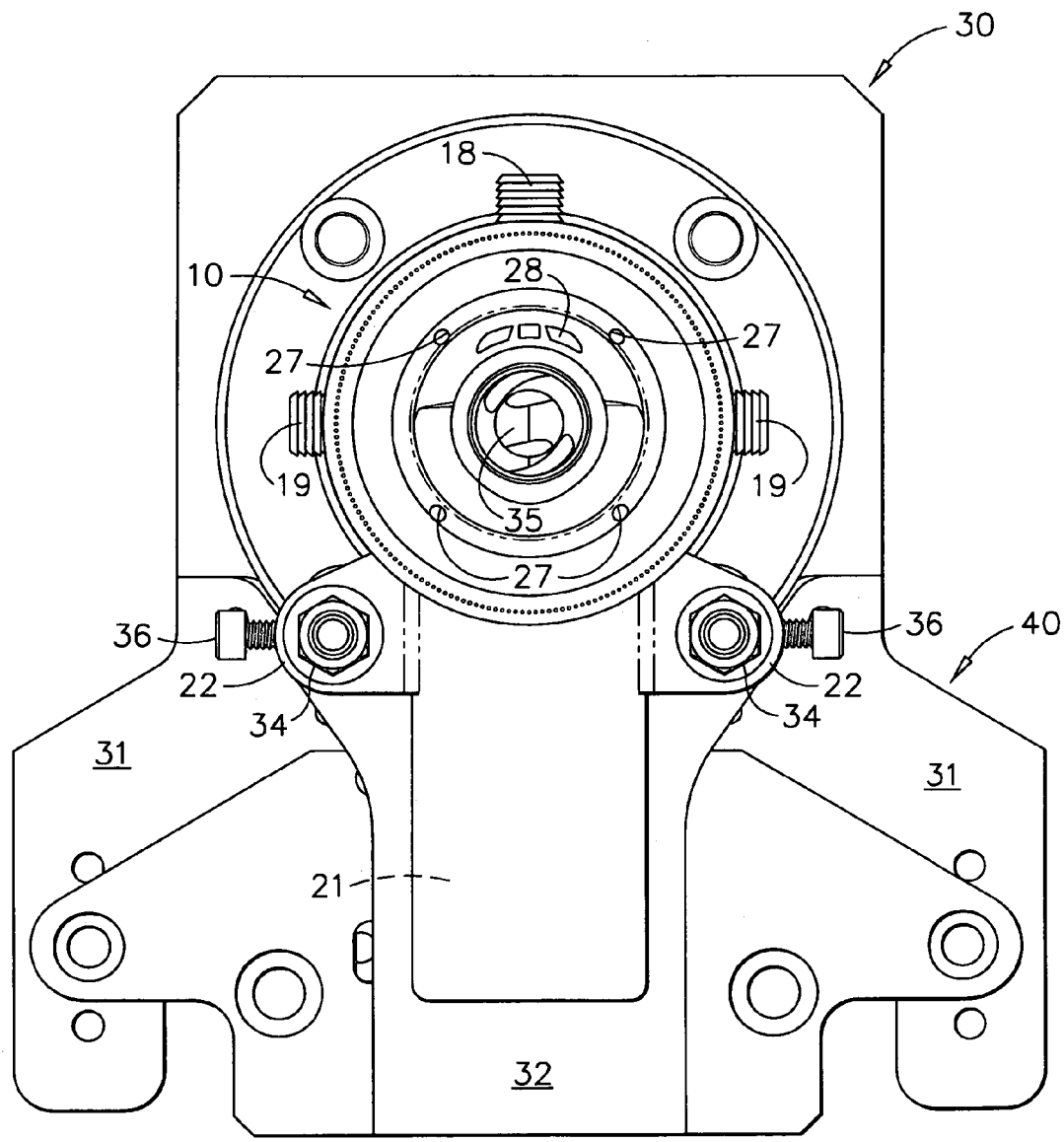
FIG. 11 is a front view of the drill nozzle attached to the drill motor unit according to another embodiment of the present invention.

Referring now to FIGS. 9, 10, 11 and 12, a drill nozzle 10 attached to a drill motor unit 30 is illustrated according to another embodiment of the present invention. A mounting device 40 may include two horseshoe brackets 31 that may be attached to the base section of the drill motor unit 30, as shown in FIGS. 9 and 10. The mounting device 40 may further include a mounting plate 32 in rigid connection with the horseshoe brackets 31 and two adjustable slides 33. Each mounting flange 22 of the drill nozzle 10 may be connected with the mounting plate 32 using one of the adjustable slides 33. A mounting screw 34 may be used to secure the adjustable slide 33 to the mounting flange 22 after insertion of the adjustable slide 33 through the aperture 23 in the mounting flange 22. The mounting device 40 may be designed to position the drill nozzle 10 such that a drill bit 35 may pass through the internal chamber 24 of the housing 11, such that it may extend coaxially with the first axis 14, entering the chamber 24 from the second open end 17 of the housing 11 and exiting the chamber at the first open end 16. Further, the drill nozzle 10 may be mounted to the drill motor unit 30 such that the air intake 18 is pointing downward and the vacuum tube 21 is pointing downward along the first axis 14.

Figure 12:
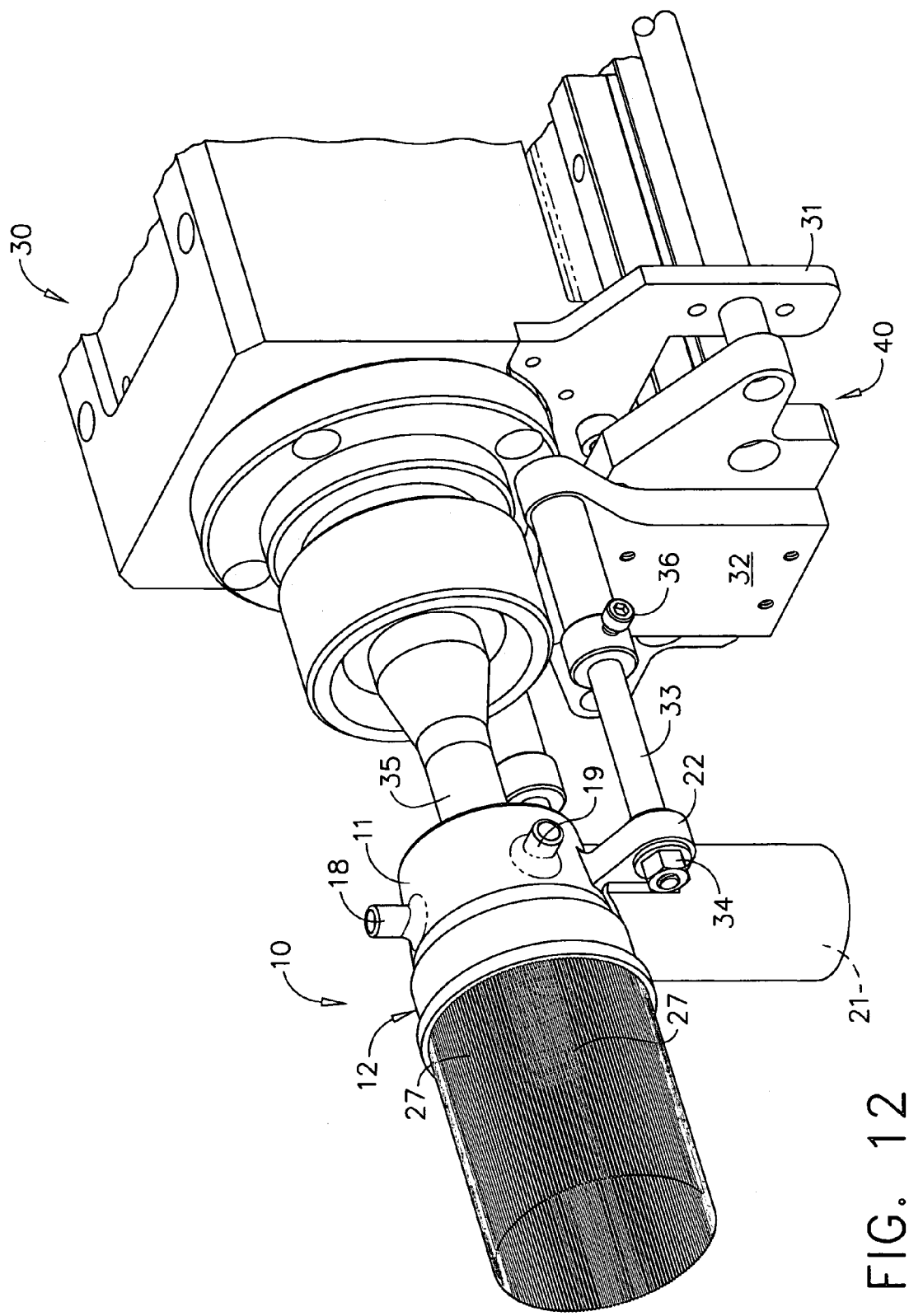
FIG. 12 is a perspective view of the drill nozzle attached to the drill motor unit according to still another embodiment of the present invention.

The distance of the drill nozzle 10 from the drill motor unit 30 may be adjusted according to the size of the drill bit by extending or retracting the adjustable slides 33. FIG. 9 shows the drill nozzle 10 in a retracted position while FIG. 12 shows the drill nozzle 10 in an extended position. A locking screw 36 may be used to hold the drill nozzle 10 in the desired position relative to the drill motor unit 30, as illustrated in FIGS. 9, 10, and 12.

A method for providing coolant to a drill bit and for vacuum extracting drilling debris generated during the drilling process on non-flat surfaces may include the steps of: attaching a drill nozzle 10 to a drill motor unit 30, adjusting the distance of the drill nozzle 10 from the drill motor unit 30 according to the desired size of the drill bit 35 by extending or retracting the adjustable slides 33 and securing the desired position with the locking screw 36, providing coolant fluid through the coolant inlet 19 toward the coolant jets 27, expelling coolant fluid towards the drill bit 35, starting to drill a hole into a non-flat surface, vacuum extracting the drilling debris and remaining coolant fluid through the vacuum tube 21, preventing metal chips and composite dust from exiting the drill nozzle 10 towards the drill motor unit 30 by providing pressurized air through the air intake 18 and by providing a thrust-vectored down draft 29 into the vacuum tube 21 using the manifold air nozzle 28. Furthermore, by attaching the bristle brush ring 12 to the first section 13 of the housing 11, metal chips, composite dust, and coolant fluid may be contained inside the bristle brush ring 12 preventing damage and soiling of surrounding structures and areas. The drill motor unit 30, to which the drill nozzle may be attached, may be a drill motor unit of a prior art numerically controlled drill jig. The non-flat surface may be, for example, a leading edge extension spar of the F-18 aircraft.

Therefore, by using the coolant feed drill nozzle 10 with thrust-vectored intake of the present invention, it may be possible to drill holes having a high quality and accuracy into non-flat surfaces while using the advantages of a numerically controlled drill jig. Although, the drill nozzle 10 as disclosed in one embodiment of the present invention may be most effective when attached to the drill motor unit 30 of a numerically controlled drill jig and for drilling holes, for example, into a leading edge extension spar of the F-18 aircraft, it may be used with other drill motor units and applications as well.

It should be understood, of course, that the foregoing relates to preferred embodiments of the invention and that modifications may be made without departing from the spirit and scope of the invention as set forth in the following claims.

We claim:

1. A drill nozzle, comprising:
  a housing including a first section and a second section, said first section intersecting with said second section;
    wherein said first section has a cylindrical elongated shape, a hollow interior, and a first axis, said first section extending along said first axis;
    wherein said first section has a first open end and a second open end opposite from said first open end, said first open end and said second open end being terminal ends spaced apart along said first axis and defining a spherical internal chamber therein;
    wherein said first section includes an air intake having a cylindrical shape, said air intake being located proximate to said second open end and above said second section, said air intake extending said housing downward in a right angle to said first axis;
    wherein said first section further includes a first coolant inlet having a cylindrical shape and extending said housing sideward in a right angle to said first axis, a first integrally molded coolant passageway, and a first set of at least two coolant jets, said first coolant passageway connecting said first coolant inlet with said first set of coolant jets, wherein said first set of coolant jets is integrally molded into said first open end;
    wherein said first section further includes a second coolant inlet having a cylindrical shape and extending said housing sideward in a direction opposite to said first coolant inlet and in a right angle to said first axis, a second integrally molded coolant passageway, and a second set of at least two coolant jets, said second coolant passageway connecting said second coolant inlet with said second set of coolant jets, wherein said second set of coolant jets is integrally molded into said first open end;
    wherein said second section has a cylindrical elongated shape, a hollow interior, and a second axis being in a right angle with said first axis, said second section extending downward from said first section along said second axis and said second section being located proximate to said second open end of said first section;
    wherein said second section includes a vacuum tube being in connection with said spherical internal chamber of said first section;
    wherein said second section further includes at least two mounting flanges having an aperture, said mounting flanges being located proximate to the intersection of said first section and said second section and said mounting flanges extending sideward from said housing to opposite sides in a right angle to said first axis and said second axis; and
  a bristle brush ring, said bristle brush ring being attached to said first section of said housing proximate to said first open end.

2. The drill nozzle of claim 1, wherein said first open end of said first section of said housing has a first outer diameter and a first inner diameter being smaller than said first outer diameter, wherein said second open end of said first section of said housing has a second outer diameter and a second inner diameter being smaller than said second outer diameter, and wherein said first inner diameter is larger than said second inner diameter.

3. The drill nozzle of claim 2, wherein said first set of coolant jets and said second set of coolant jets are evenly spaced around the circumference of said first open end and between said first outer diameter and said first inner diameter of said first end, and wherein each of said coolant jets is positioned to expel coolant fluid toward said first axis.

4. The drill nozzle of claim 1, wherein said first coolant inlet includes an integrally molded coolant nozzle and wherein said second coolant inlet includes an integrally molded coolant nozzle.

5. The drill nozzle of claim 1, wherein said first coolant inlet and said second coolant inlet have a barbed fitting.

6. The drill nozzle of claim 1, wherein said first coolant inlet and said second coolant inlet receive coolant fluid from an external source.

7. The drill nozzle of claim 1, wherein said air intake includes an integrally molded manifold air nozzle, said air nozzle being located in the back of said internal chamber proximate to said second open end of said first section and above said vacuum tube along said second axis.

8. The drill nozzle of claim 7, wherein said air nozzle provides a thrust-vectored down draft into said vacuum tube.

9. The drill nozzle of claim 1, wherein said air intake includes a barbed fitting.

10. The drill nozzle of claim 1, wherein said air intake is connected to an external source providing pressurized air.

11. The drill nozzle of claim 1, wherein said vacuum tube intersects with said internal chamber proximate to said second open end.

12. The drill nozzle of claim 1, wherein said vacuum tube is attached to an external vacuum source.

13. The drill nozzle of claim 1, wherein said housing is made of acrylonitrile butadiene styrene (ABS) plastic.

14. The drill nozzle of claim 1, wherein said housing is manufactured in one piece using a fused deposition modeled process.

15. The drill nozzle of claim 1, wherein said bristle brush ring is made of a material that can be wrapped around said housing and wherein said bristle brush ring is secured to said housing proximate to said first open end using a band clamp.

16. The drill nozzle of claim 1, wherein said housing is attached to a drill motor unit.

17. A drill nozzle, comprising:
a housing including a first section and a second section, said first section intersecting with said second section;
wherein said first section has a cylindrical elongated shape, a hollow interior, and a first axis, said first section extending along said first axis;
wherein said first section has a first open end and a second open end opposite from said first open end, said first open end and said second open end being terminal ends spaced apart along said first axis and defining a spherical internal chamber therein;
wherein said first section includes an air intake having a cylindrical shape, said air intake being located proximate to said second open end and above said second section, said air intake extending said housing downward in a right angle to said first axis;
wherein said first section further includes a first coolant inlet having a cylindrical shape and extending said housing sideward in a right angle to said first axis, a first integrally molded coolant passageway, and a first set of at least two coolant jets, said first coolant passageway connecting said first coolant inlet with said first set of coolant jets, wherein said first set of coolant jets is integrally molded into said first open end;
wherein said first section further includes a second coolant inlet having a cylindrical shape and extending said housing sideward in a direction opposite to said first coolant inlet and in a right angle to said first axis, a second integrally molded coolant passageway, and a second set of at least two coolant jets, said second coolant passageway connecting said second coolant inlet with said second set of coolant jets, wherein said second set of coolant jets is integrally molded into said first open end;
wherein said second section has a cylindrical elongated shape, a hollow interior, and a second axis being in a right angle with said first axis, said second section extending downward from said first section along said second axis and said second section being located proximate to said second open end of said first section;
wherein said second section includes a vacuum tube being in connection with said spherical internal chamber of said first section;
wherein said second section further includes at least two mounting flanges having an aperture, said mounting flanges being located proximate to the intersection of said first section and said second section and said mounting flanges extending sideward from said housing to opposite sides in a right angle to said first axis and said second axis;
a bristle brush ring, said bristle brush ring being attached to said first section of said housing proximate to said first open end; and
a mounting device, wherein said mounting device attaches said housing to a drill motor unit.

18. The drill nozzle of claim 17, wherein said mounting device includes:
two horse shoe brackets that attach to a base section of said drill motor unit,
a mounting plate in rigid connection with said horse shoe brackets, and
two adjustable slides attached to said mounting plate at opposite sides, wherein said adjustable slides connect said mounting plate with said mounting flanges of said housing.

19. The drill nozzle of claim 17, further including two locking screws that secure said adjustable slides.

20. The drill nozzle of claim 17, wherein said drill motor unit is part of a numerically controlled drill jig used to drill holes into a leading edge extension spar of the F-18 aircraft.

21. A numerically controlled drill jig, comprising:
a drill motor unit;
a drill nozzle being attached to said drill motor unit and including:
a housing including a first section and a second section, said first section intersecting with said second section;
wherein said first section has a cylindrical elongated shape, a hollow interior, and a first axis, said first section extending along said first axis;
wherein said first section has a first open end and a second open end opposite from said first open end, said first open end and said second open end being terminal ends spaced apart along said first axis and defining a spherical internal chamber therein;
wherein said first section includes an air intake having a cylindrical shape, said air intake being located proximate to said second open end and above said second section, said air intake extending said housing downward in a right angle to said first axis;
wherein said first section further includes a first coolant inlet having a cylindrical shape and extending said housing sideward in a right angle to said first axis, a first integrally molded coolant passageway, and a first set of at least two coolant jets, said first coolant passageway connecting said first coolant inlet with said first set of coolant jets, wherein said first set of coolant jets is integrally molded into said first open end;
wherein said first section further includes a second coolant inlet having a cylindrical shape and extending said housing sideward in a direction opposite to said first coolant inlet and in a right angle to said first axis, a second integrally molded coolant passageway, and a second set of at least two coolant jets, said second coolant passageway connecting said second coolant inlet with said second set of coolant jets, wherein said second set of coolant jets is integrally molded into said first open end;
wherein said second section has a cylindrical elongated shape, a hollow interior, and a second axis being in a right angle with said first axis, said second section extending downward from said first section along said second axis and said second section being located proximate to said second open end of said first section;

wherein said second section includes a vacuum tube being in connection with said spherical internal chamber of said first section;

wherein said second section further includes at least two mounting flanges having an aperture, said mounting flanges being located proximate to the intersection of said first section and said second section and said mounting flanges extending sideward from said housing to opposite sides in a right angle to said first axis and said second axis;

a bristle brush ring, said bristle brush ring being attached to said first section of said housing proximate to said first open end; and a mounting device attaching said housing to said drill motor unit, said mounting device including:
two horse shoe brackets that attach to a base section of said drill motor unit,
a mounting plate in rigid connection with said horse shoe brackets, and
two adjustable slides attached to said mounting plate at opposite sides, wherein said adjustable slides connect said mounting plate with said mounting flanges of said housing.

22. The numerically controlled drill jig of claim 21, further comprising an external source providing pressurized air to said air intake.

23. The numerically controlled drill jig of claim 21, further comprising an external coolant source being connected to said first coolant inlet and said second coolant inlet.

24. The numerically controlled drill jig of claim 21, further comprising an external vacuum source being connected to said vacuum tube.

25. A coolant feed drill nozzle with thrust-vectored intake, comprising:
a housing including a first section and a second section, said first section intersecting with said second section;
wherein said first section has a cylindrical elongated shape, a hollow interior, and a first axis, said first section extending along said first axis;
wherein said first section has a first open end and a second open end opposite from said first open end, said first open end and said second open end being terminal ends spaced apart along said first axis and defining a spherical internal chamber therein;
wherein said first open end of said first section of said housing has a first outer diameter and a first inner diameter being smaller than said first outer diameter, wherein said second open end of said first section of said housing has a second outer diameter and a second inner diameter being smaller than said second outer diameter, and wherein said first inner diameter is larger than said second inner diameter;
wherein said first section includes an air intake having a cylindrical shape and a barbed fitting, said air intake being located proximate to said second open end and above said second section, said air intake extending said housing downward in a right angle to said first axis;
wherein said air intake includes an integrally molded manifold air nozzle, said air nozzle providing a thrust-vectored down draft into said second section of said housing;
wherein said first section further includes a first coolant inlet having a cylindrical shape, a barbed fitting, and an integrally molded coolant nozzle, said first coolant inlet extending said housing sideward in a right angle to said first axis;
wherein said first section further includes a first integrally molded coolant passageway, and a first set of at least two coolant jets, said first coolant passageway connecting said first coolant inlet with said first set of coolant jets, wherein said first set of coolant jets is integrally molded into said first open end;
wherein said first section further includes a second coolant inlet having a cylindrical shape, a barbed fitting, and an integrally molded coolant nozzle, said second coolant inlet extending said housing sideward in a direction opposite to said first coolant inlet and in a right angle to said first axis;
wherein said first section further includes a second integrally molded coolant passageway, and a second set of at least two coolant jets, said second coolant passageway connecting said second coolant inlet with said second set of coolant jets, wherein said second set of coolant jets is integrally molded into said first open end;
wherein said first set of coolant jets and said second set of coolant jets are evenly spaced around the circumference of said first open end and between said first outer diameter and said first inner diameter of said first end, and wherein each of said coolant jets is positioned to expel coolant fluid toward said first axis;
wherein said second section has a cylindrical elongated shape, a hollow interior, and a second axis being in a right angle with said first axis, said second section extending downward from said first section along said second axis and said second section being located proximate to said second open end of said first section;
wherein said second section includes a vacuum tube being in connection with said spherical internal chamber of said first section;
wherein said second section further includes at least two mounting flanges having an aperture, said mounting flanges being located proximate to the intersection of said first section and said second section and said mounting flanges extending sideward from said housing to opposite sides in a right angle to said first axis and said second axis;
a bristle brush ring, said bristle brush ring being attached to said first section of said housing proximate to said first open end; and
a band clamp that secures said bristle brush ring to said housing;
an external pressurized air source that provides pressurized air to said air intake;
an external coolant source that provides coolant to said first coolant inlet and said second coolant inlet; and
an external vacuum source that provides suction to said vacuum tube.

26. The coolant feed drill nozzle with thrust-vectored intake of claim 25, wherein said housing is manufactured in one piece using a fused deposition modeled process and an ABS plastic material.

27. The coolant feed drill nozzle with thrust-vectored intake of claim 25, wherein said housing is attached to a drill motor unit of a numerically controlled drill jig.

* * * * *